United States Patent
Bailey et al.

[11] Patent Number: 5,938,873
[45] Date of Patent: Aug. 17, 1999

[54] TOOLING AND METHOD FOR JOINING A HEEL PAD TO A FLOOR MAT

[75] Inventors: Bob Bailey, Charlton; David G. Reilly, Stillwater; Donald J. Nicoll, Clifton Park, all of N.Y.

[73] Assignee: Racemark International, Inc., Malta, N.Y.

[21] Appl. No.: 08/800,707

[22] Filed: Feb. 14, 1997

[51] Int. Cl.$^6$ .......................... B29C 65/06; B29C 65/08
[52] U.S. Cl. ............. 156/73.1; 156/73.5; 156/290; 156/308.4; 156/580.1
[58] Field of Search .................. 156/73.1, 73.5, 156/73.6, 580, 580.1, 580.2, 290, 308.2, 308.4

[56] References Cited

U.S. PATENT DOCUMENTS

| | | | |
|---|---|---|---|
| 2,723,937 | 11/1955 | Rice | 154/106 |
| 4,247,587 | 1/1981 | Cherault | 428/155 |
| 4,497,854 | 2/1985 | Milner et al. | 428/17 |
| 4,576,848 | 3/1986 | Dillon et al. | 428/89 |
| 4,721,641 | 1/1988 | Bailey | 428/88 |
| 4,749,602 | 6/1988 | Russel | 428/99 |
| 4,758,457 | 7/1988 | Altus | 428/82 |
| 4,798,639 | 1/1989 | Yamaguchi | 156/73.1 |
| 4,828,898 | 5/1989 | Bailey | 428/88 |
| 4,871,602 | 10/1989 | Luker | 428/88 |
| 4,904,319 | 2/1990 | Divincenzo et al. | 156/73.4 |
| 5,026,445 | 6/1991 | Malnolfi et al. | 156/73.5 |
| 5,269,860 | 12/1993 | Rice | 156/73.1 |
| 5,411,616 | 5/1995 | Desai et al. | 156/73.1 |
| 5,439,725 | 8/1995 | Roberts | 428/95 |
| 5,468,335 | 11/1995 | Mainolfi et al. | 156/580.2 |
| 5,705,003 | 1/1998 | Farrow et al. | 156/73.5 |

FOREIGN PATENT DOCUMENTS

| | | | |
|---|---|---|---|
| 32 100 38 A1 | 10/1983 | Germany | D06N 7/00 |
| 37 18424 A1 | 12/1987 | Germany | B60N 3/04 |
| 37 18424 C2 | 11/1989 | Germany | B60N 3/04 |
| 60-11147 | 3/1985 | Japan | D04H 3/14 |
| 6-226853 | 8/1994 | Japan | B29C 65/08 |

*Primary Examiner*—James Sell
*Attorney, Agent, or Firm*—Heslin & Rothenberg, P.C.

[57] ABSTRACT

A tool for vibrationally joining a heel pad to a floor mat includes a platen having a first region and a second region. A first plurality of pins may extend from the first region of the platen, and a second plurality of pins may extend from the second region of the platen. The first plurality of pins are arranged non-parallel to the second plurality of pins. The method of joining a heel pad to a floor mat includes applying a glue between the heel pad and the floor mat, and thereafter vibrationally welding the heel pad and floor mat such that a perimeter region of the heel pad is recessed lower than an interior region of the heel pad. In another aspect of the subject invention, a perimeter region of a heel pad may be joined to a floor mat includes ultrasonically welding a portion of the perimeter or rim region of the heel pad to the floor mat, and thereafter ultrasonically welding the remaining portion of the perimeter region of the heel pad to the floor mat.

31 Claims, 6 Drawing Sheets

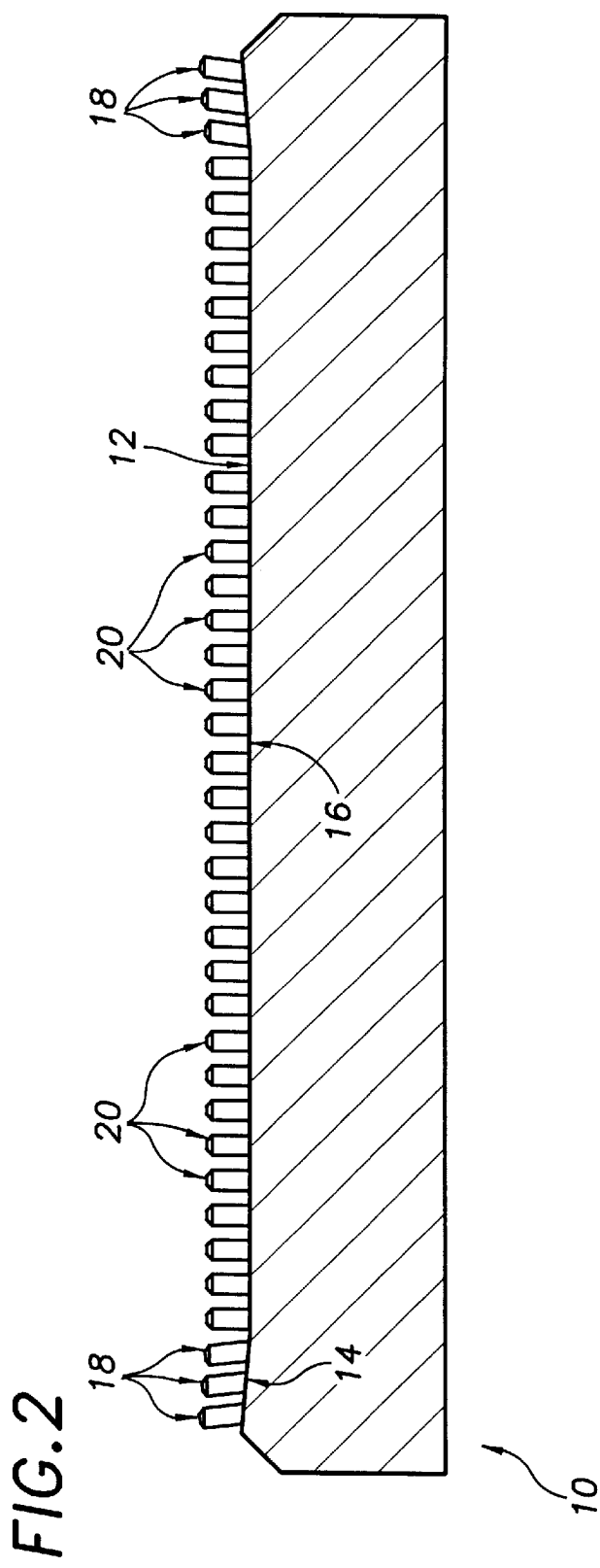
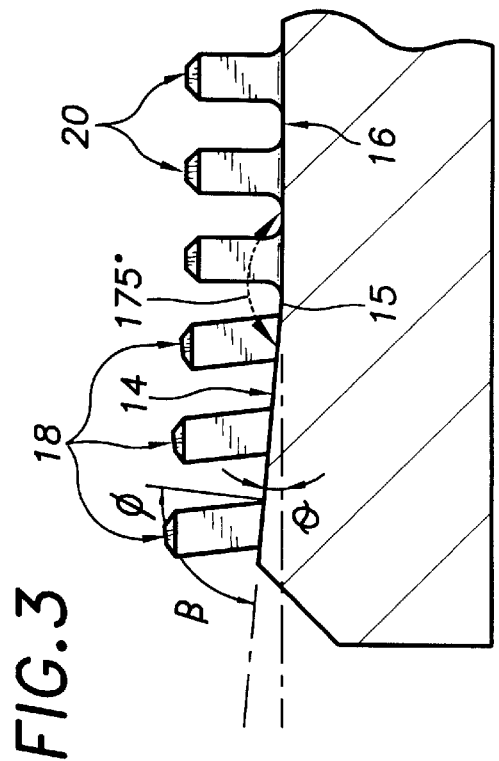

TOOLING AND METHOD FOR JOINING A HEEL PAD TO A FLOOR MAT

BACKGROUND

1. Technical Field

The present invention generally relates to floor mats for use in automobiles and other motor vehicles. More particularly, the present invention relates to removable accessory mats designed to overlie and protect carpeted automobile floors.

2. Background Information

Floor mats of the "throw-in" or accessory type are widely employed to protect the carpeted floors of automobiles and other vehicles. These mats are generally manufactured with a planar configuration and are usually formed from a material sufficiently flexible to conform in a general way to the multiplicity of shapes and contours characteristic of automobile floors.

A problem associated with automobile floor mats is their tendency to wear in certain "high use" areas, e.g., where the driver's feet are usually stationed. Specifically, a floor mat located on the driver's side of an automobile tends to wear more extensively near the gas pedal. Because of the extended wear in these "high use" areas, it is common to attach what is known as a heel pad to the floor mat. Because heel pads need to withstand extensive wear and tear, they preferably are constructed of a woven heavy-weight carpet with an appropriate backing.

Since the heel pad is separately formed from the floor mat, the heel pad and floor mat must be joined together. The conventional technique used to join heel pads to floor mats is through the use of a hot melt adhesive film or glue, together with processing through a heat tunnel. However, while this technique can be used with materials having high melting points, such as nylon, the heat tunnel technique cannot be successfully employed with heel pads and floor mats made from materials having lower melting point temperatures, like polypropylene. The temperatures required in the heat tunnel technique tend to melt the polypropylene material, thereby resulting in the unsightly distortion of the accessory mat. However, under certain circumstances, it is desirable to fabricate floor mats and heel pads from such materials. One desirable reason to use polypropylene is to offer a recyclable accessory mat.

Moreover, the conventional technique of the heat tunnel is unable to produce a joined heel pad and floor mat having a perimeter region of the heel pad made flush (or recessed in relation) to the upper surface of the floor mat. Therefore, the edges of a resulting heel pad sit above the floor mat, and are exposed for contact with the driver's feet. In addition, the heat tunnel method also does not always result in a sufficient bond between the heel pad and floor mat, and the edges of the heel pad may peel away from the floor mat and result in fraying and unraveling. Therefore, it may be necessary to "rim seal" the perimeter region of the nylon heel pads to the floor mats. The conventional method for rim sealing the perimeter region is by way of a radio frequency (RF) welding technique. By rim sealing the perimeter region by RF welding, a greater bond can be achieved between the heel pad and floor mat, and the edges of the heel pad can be recessed into the floor mat so that the interior region of the heel pad can be made flush to the upper surface of the floor mat. RF welding, however, cannot be employed with materials having low melting point temperatures, such as polypropylene, again because of the melting of the material and unsightly distortion thereof. Also, where RF welding is appropriate, such as with nylon materials, a channel is formed about the peripheral edge of the heel pad, which may not always be desirable.

Thus, a need exists for a new tool and method for joining heel pads to floor mats, which can be effectively used on floor mats and heel pads constructed from materials having low melting point temperatures. The structure and method of the present invention presents a solution to the aforementioned problems.

SUMMARY OF THE INVENTION

Briefly, the present invention satisfies this need and overcomes the shortcomings of the prior art through the provision of tooling and a method for joining a heel pad to a floor mat. The tool of the subject invention includes a platen having a first region and a second region. A first plurality of pins may extend from the first region of the platen, and a second plurality of pins may extend from the second region of the platen. The first plurality of pins are arranged to be non-parallel to the second plurality of pins.

The method of the subject invention for joining a heel pad to a floor mat includes applying a glue between the heel pad and the floor mat, and thereafter vibrationally welding the heel pad and floor mat such that a perimeter region of the heel pad may be even with or recessed lower than an interior region of the heel pad.

Another aspect of the present invention is a method for joining a perimeter region of a heel pad to a floor mat, which includes ultrasonically welding a portion of the perimeter region of the heel pad to the floor mat, and thereafter ultrasonically welding the remaining portion of the perimeter region of the heel pad to the floor mat.

It is therefore a primary object of the present invention to provide a new and improved tool and method for joining a heel pad to a floor mat.

It is yet another object of the present invention to provide a tool and method for vibrationally welding a heel pad to a floor mat.

It is another object of the present invention to provide a method which is applicable to materials having low melting point temperatures, such as polypropylene.

It is still another object of the present invention to provide a combination heel pad and floor mat which results in an aesthetically pleasing accessory mat.

It is yet another object of the present invention to provide a joined heel pad and floor mat which is exceptionally durable and which results in a high peel strength for the resultant accessory mat.

It is yet another object of the present invention to provide a joined heel pad and floor mat which can be manufactured at an improved cycle time over existing techniques.

It is still another object of the present invention to provide a tool and method for joining a heel pad to a floor mat which reduces manufacturing costs over existing techniques.

It is also an object of the present invention to provide an ultrasonic welding method for joining a perimeter or rim region of a heel pad to floor mat.

It is a further object of the present invention to provide a method for joining a perimeter region of heel pads and floor mats constructed from polypropylene.

BRIEF DESCRIPTION OF THE DRAWINGS

The subject matter which is regarded as the present invention is particularly pointed out and distinctly claimed in the concluding portion of the specification. The invention, however, both as to organization and method of practice, together with the further objects and advantages thereof, may be best understood by reference to the following detailed description of the preferred embodiments, taken in conjunction with the accompanying drawings, in which:

FIG. 2 is a side cross-sectional view of one embodiment of the tool of the present invention having a first plurality of pins extending from the first region of the platen and a second plurality of pins extending from the second region of the platen, wherein the first region of said platen is skewed in relation to said second region.

FIG. 3 is a cross-sectional exploded and exaggerated view illustrating the skewed nature of one side of the perimeter region of the platen in relation to the interior region, also depicting the orientation and head structure of the pins extending from both the perimeter region and the interior region of the platen.

DESCRIPTION

It will be readily apparent that the components and steps of the present invention, as generally described and illustrated in the figures, could be arranged and designed in a wide variety of different configurations. Thus, the following detailed description of the presently preferred embodiments of the tooling and method for joining a heel pad to a floor mat of the present invention, as represented in FIGS. 1–9, is not intended to limit the scope of the invention, as claimed, but is merely representative of the presently preferred embodiments of the invention. The presently preferred embodiments of the invention will be best understood by reference to the drawings, where like parts are designated with like numerals.

A floor mat typically comprises several layers of different materials. For example, the floor mat for which the tooling and method as defined herein may be employed includes a first layer of polypropylene carpet fibers, which are tufted into a polypropylene scrim. Coated to the underside of the scrim may be a layer of latex. A final backing layer may be a polypropylene thermoplastic olefin ("TPO"). Similarly, a heel pad may include various different layers, e.g., a layer of polypropylene carpet fibers tufted into a polypropylene scrim, with a latex coating applied to the underside of the scrim. It should be known that other materials are also suitable for use in the subject invention, including nylon.

Figure 1A:
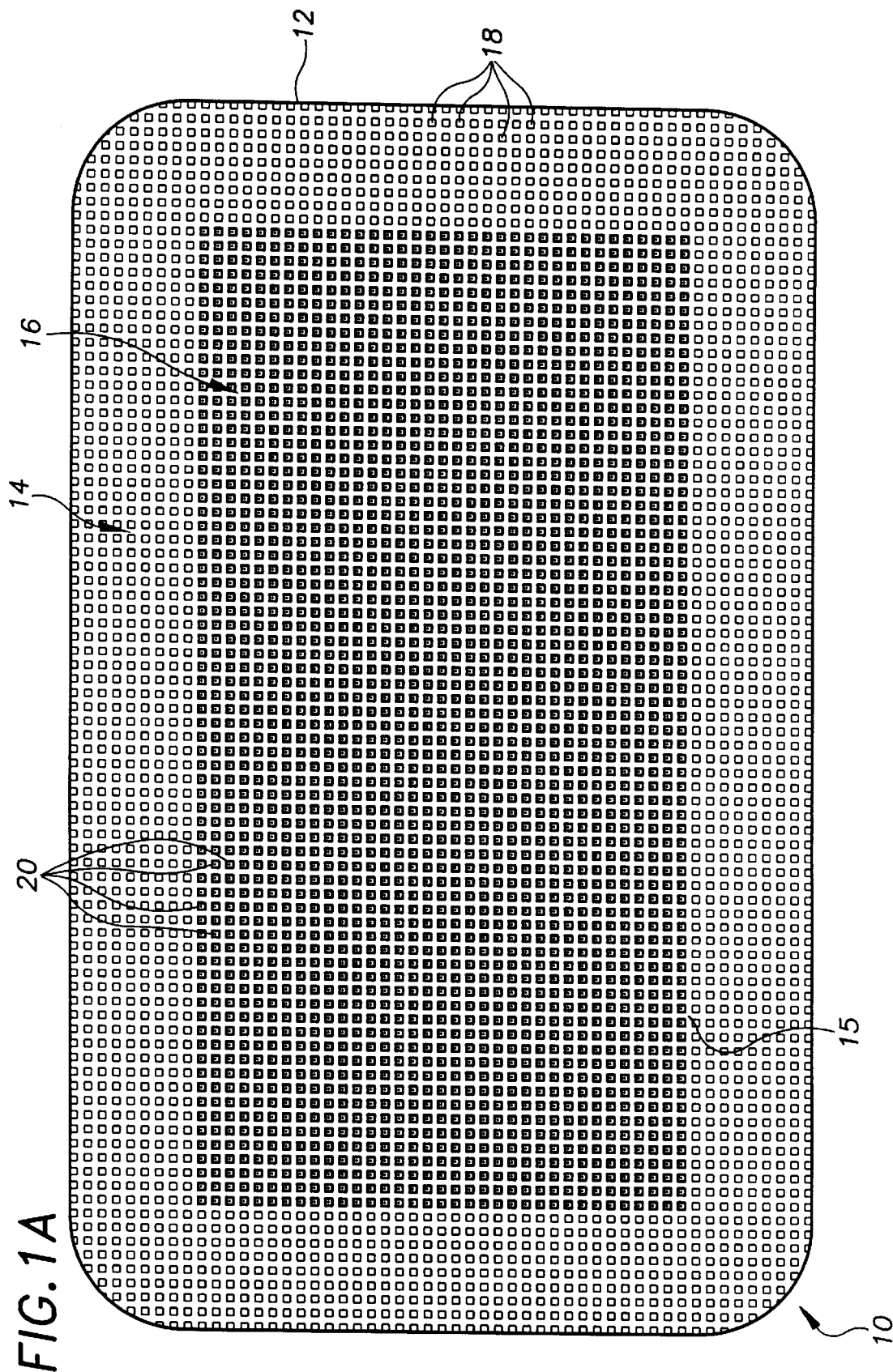
FIG. 1A is a plan view of a tool having an array of pins extending away from a platen wherein the platen includes a perimeter region and an interior region.

In reference to the drawings, and more particularly to FIGS. 1 & 2, there is shown in accordance with the principles of the present invention, one embodiment of a tool 10 used for vibrationally welding a heel pad to a floor mat. As can be best seen from the plan view of FIG. 1A, tool 10 may include a platen 12 divided into two regions, a first region 14, e.g., a perimeter region, and a second region 16, e.g., an interior region. A border 15 delineates perimeter region 14 from interior region 16.

FIG. 1A also displays an array of pins which extend away from platen 12. More specifically, a first plurality of pins 18 may extend away from perimeter region 14 of platen 12 and a second plurality of pins 20 may extend away from said interior region 16 of platen 12. In the preferred embodiment, pins 18 and 20 are of equal length and are spaced equally on their respective regions. As described more fully hereinafter, it is the unique configuration and positioning of these pins which forms a significant aspect of the subject invention.

Figure 1B:
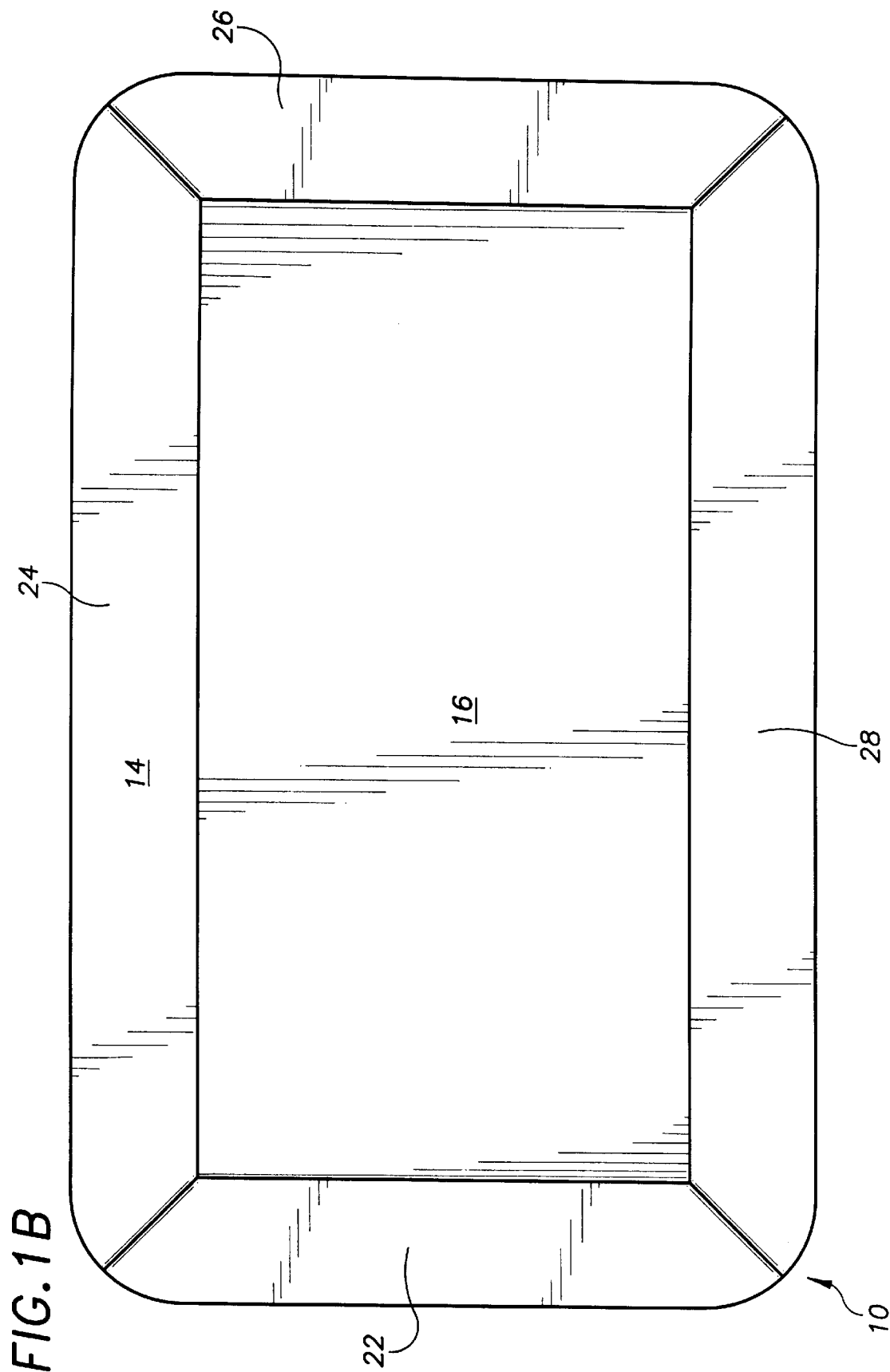
FIG. 1B is another plan view of the tool of FIG. 1A, illustrating that the tool can include five separate components, i.e., the interior region, and the perimeter region which comprises four side sections.

As can be seen in FIG. 1B, in the preferred embodiment, tool 10 comprises five separate components or sections. As depicted in FIG. 1B, these five sections include a central member which forms interior region 16, and four outer sections which form perimeter region 14. Therefore, perimeter region 14 may comprise a first section 22, a second section 24, a third section 26 and a fourth section 28. By way of conventional methods of attachment, each of the four outer sections and interior region 16 can be attached together to form tool 10. Preferably, the five components or sections are mounted to an aluminum block.

In the preferred embodiment, first region 14 extends around the perimeter of platen 12, and second region 16 may be disposed within first region 14.

Therefore, second region 16 may be surrounded by first region 14. Preferably, interior region 16 is a flat planar surface, centrally located on platen 12.

As illustrated in FIGS. 2 and 3, first region 14 is skewed in relation to second region 16, thus providing a sloped configuration about the perimeter of platen 12. In the preferred embodiment (see FIG. 3), an angle of 175 degrees is formed between the planar surface of perimeter region 14 and the planar surface interior region 16. Therefore, there is a skew angle (θ) of 5 degrees between perimeter region 14 and inner region 16.

It should be understood that other degrees of skew may be employed in the subject invention, and the invention is in no way limited to the 5 degrees described above. Depending upon the nature and characteristic of the weld desired, it may be advantageous to provide a skew greater or less than 5 degrees. Therefore, the angle formed between the planar surface of perimeter region 14 and the planar surface interior region 16 may be less than 180 degrees. The specific skew ultimately selected will depend on a variety of characteristics, including, for example, the degree of recess desired for the perimeter region of the heel pad into the floor mat.

Because tool 10 is employed for joining a heel pad to a floor mat, platen 12 should correspond to the shape of the specific heel pad desired to be joined to the floor mat. As shown best in FIG. 1A & 1B, tool 10 is rectangular in shape to correspond to a heel pad which also is rectangular in shape. However, the actual shape of tool 10 will depend upon the desired shape for the heel pad, which can take a variety of different shapes and forms.

Figure 6:
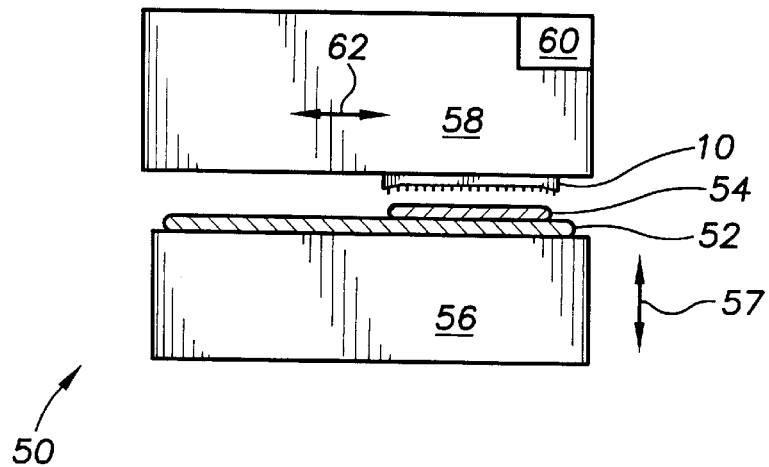
FIG. 6 is a block diagram illustrating an apparatus which is employed to vibrationally weld heel pads to floor mats, also depicting a floor mat and a heel pad positioned on a lower fixture of the apparatus, the heel pad being disposed beneath the tool of the subject invention.

As for the specific tool described in the subject application, tool 10 is preferably employed such that perimeter pins 18 and interior pins 20 face downward during operation (see FIG. 6). When viewing the side of tool 10 having pins 18 and 20 projecting from platen 12, as shown in FIG. 1A, first region 14 and second region 16 resembles a "pool-like" structure, which includes four sloping side walls. Sections 22, 24, 26 and 28 represent the side walls of the "pool-like" structure (see FIG. 1B).

First plurality of pins 18 extend away from first region 14 and second plurality of pins 20 extend away from second region 16. Because of their location on separate regions of platen 12, first plurality of pins 18 may be referred to as "perimeter" pins 18 throughout this specification, while second plurality of pins 20 may be referred to as "interior" pins 20. Pins 18 and 20 may be fabricated from hardened A2 tool steel.

As can be seen best in FIG. 3, each perimeter pin 18 is preferably angled or tilted outward towards its respective outer edge of first region 14. For example, pins 18 extending from side section 22 (FIG. 1B) of perimeter region 14 may be tilted towards an outer edge of side section 22. Preferably, an angle (β) of 75 degrees may be formed between a central longitudinal axis of each perimeter pin 20 and the planar surface corresponding to the respective section of the perimeter region 14 from which each pin projects. Therefore, each pin is preferably tilted 10 degrees, from an imaginary axis which runs perpendicular to the planar surface of interior region 16. Therefor, an angle (Φ) of 10 degrees is preferably formed between the vertical axis running perpendicular to the planar surface of interior region 16 and the central longitudinal axis of each pin 18.

While a tilt angle of 10 degrees is preferred, it should be noted that the present invention is in no way limited to such an angle. Therefore, in lieu thereof, the degree of angulation or tilt for each perimeter pin 18 may be adjusted, depending upon the desired characteristics for the weld between the heel pad and floor mat.

Interior pins 20 are preferably oriented perpendicular to the planar surface of interior region 16. Therefore, interior pins 20 may extend straight up and are each arranged parallel to one another. Because of the tilt of the perimeter pins 18, interior pins 20 are preferably arranged nonparallel to perimeter pins 16. Moreover, as described above, each perimeter pin 18 is angled or tilted outward towards the edge of its respective section. Therefore, for example, each of the pins extending from first section 22 are arranged nonparallel to pins extending from second surface 24, third surface 26 and fourth surface 28.

By configuring and orienting the perimeter pins 20 as described above, the edge or perimeter region of a heel pad can be set tighter to the floor mat in comparison to the interior region. Therefore, the perimeter region of the heel pad may be recessed or set slightly lower than the interior region. The interior region thus may appear fuller than the perimeter region, i.e., the interior region may be elevated to a greater degree than the perimeter region of the heel pad. Moreover, by using the tool and method as described herein, the heel pad may be joined flush to the floor mat. Depending upon aesthetic preferences, the degree of recess for the heel pad can be selectively chosen.

Figure 4A:
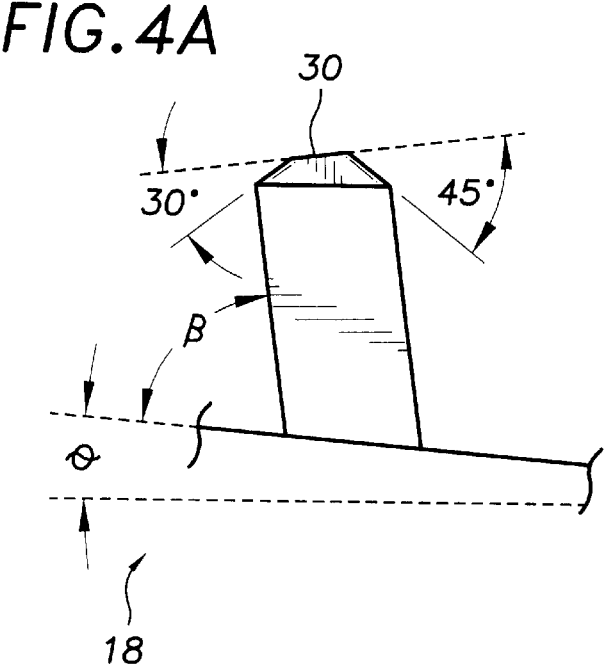
FIG. 4A is a side view illustrating a single perimeter pin constructed in accordance with the principles of the present invention.
Figure 4B:
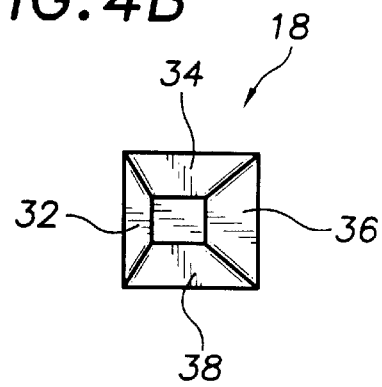
FIG. 4B is a top view depicting the perimeter pin shown in FIG. 4A.

FIGS. 4A & 4B depicts the preferred configuration of each perimeter pin 18. Each perimeter pin 18 may have a pin head which includes an upper surface 30 and four side surfaces, a first side surface 32, a second side surface 34, a third side surface 36 and a fourth side surface 38. At least one of the side surfaces, e.g., side surface 36, is formed at a 45 degree angle in relation to the upper surface 30, and at least one of the side surfaces, e.g., side surface 32, is formed at a 30 degree angle in relation to the upper surface 30. Preferably, the side surface formed at a 45 degree angle in relation to upper surface 30 is faced inward towards interior region 16. Moreover, it is preferred that the side surface formed at a 30 degree angle in relation to upper surface 20 is faced outward towards the outer edge of perimeter region 14. It should be understood that the subject invention is not restricted to the 30 and 45 degree parameters, but other values and head configurations may be substituted therefor.

Figure 5A:
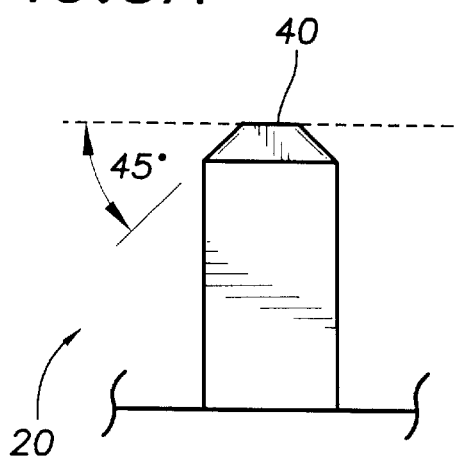
FIG. 5A is a cross-sectional side view depicting a single interior pin constructed in accordance with the principles of the present invention.
Figure 5B:
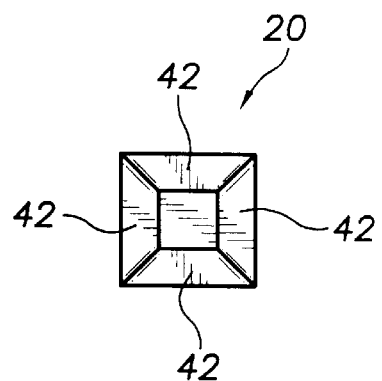
FIG. 5B is a top view of the interior pin shown in FIG. 5A.

FIGS. 5A & 5B illustrates the preferred configuration of each interior pin 20. Each interior pin 20 may have a pin head which includes an upper surface 40, and four side surfaces 42. Preferably, the four sides surfaces 42 are angled at 45 degrees in relation to upper surface 40. In lieu of the specific pin head configuration described herein, other configurations may be equally satisfactory.

FIG. 6 is a block diagram illustrating an apparatus 50 which is used in combination with tool 10 to achieve the joining of a floor mat and heel pad, in accordance with the principles of the present invention. As illustrated in FIG. 6, a floor mat 52, having its carpeted face up, is disposed on a lower fixture 56. Positioned on top of floor mat 52 is a heel pad 54, also having its carpet face up. Disposed above heel pad 54 is tool 10, together with an upper fixture 58 attached thereto. Typically, an operator would place and position floor mat 52 and heel pad 54 on lower fixture 56. As illustrated by reference number 57, lower fixture 56 may be moved vertically up and down.

Operationally, an operator positions floor mat 52 and heel pad 54 on lower fixture 56 of apparatus 50. Tool 10 is disposed directly above floor mat 52 and heel pad 54. Lower fixture 56 may then be raised vertically upward so as to force tool 10 into contact with heel pad 54. By forcing tool 10 into contact with heel pad 54, pins 18 and 20 penetrate the layers of heel pad 54. The desired amount of pressure may be varied, depending on the degree of recess desired for the peripheral boundary of heel pad 54. A motive means 60, such as are widely known in conventional vibrational welding units, may then be activated to cause tool 10 to vibrate from side to side, as depicted by arrow 62.

Another significant aspect of the subject invention is the use of a thermosetting adhesive or heat activated glue between the heel pad and floor mat. The adhesive may be employed to join the heel pad and the floor mat, wherein the adhesive may be applied to the underside of the heel pad by employing conventionally known methods. One preferred adhesive which works especially well in the present invention is marketed by BF Goodrich, and is known as PL800 adhesive. By penetrating the pins into the scrim layer of the heel pad, the vibrational energy melts the adhesive and creates the bond between the heel pad and floor mat.

After engagement of the pins, the vibration of tool 10 activates the adhesive, thereby resulting in the joining of the heel pad and floor mat together. The configuration of the pins results in the perimeter region of the heel pad being recessed below the planar surface of the floor mat.

In the vibrational welding method of the subject invention, there are four controllable parameters, i.e., frequency, amplitude, pressure and time. Each of the parameters may be adjusted, depending on the nature of the weld sought between the heel pad and floor mat. For example, if a deeper recess of the perimeter region of the heel pad into the floor mat is desired, greater pressure may be applied. As a example, the parameters may be set as follows: (1) frequency—240 hertz; (2) amplitude—$^{70}/_{1000}$th of an inch ($^{35}/_{1000}$th of an inch in each lateral direction); (3) pressure—2,500–3,500 pounds; and (4) time—15 seconds.

The new tool and vibration method of welding described above can be used to join a variety of materials, including polypropylene. While polypropylene is the preferred material, other materials may be equally suitable for use with the subject invention, e.g., nylon.

In another aspect of the present invention, a method of ultrasonically joining a perimeter region of a heel pad to a floor mat is disclosed, which can be employed to accentuate the joint created by vibration welding, as described above. In a general sense, ultrasonic welding is a process wherein coalescence of the floor mat and heel pad is achieved by the localized application of very high frequency vibratory energy to the heel pad and floor mat as they are held together under pressure. Conventionally known ultrasonic welding apparatuses may be employed in this aspect of the present invention. This technique may be described as ultrasonic rim sealing of the heel pad to the floor mat.

Figure 7:
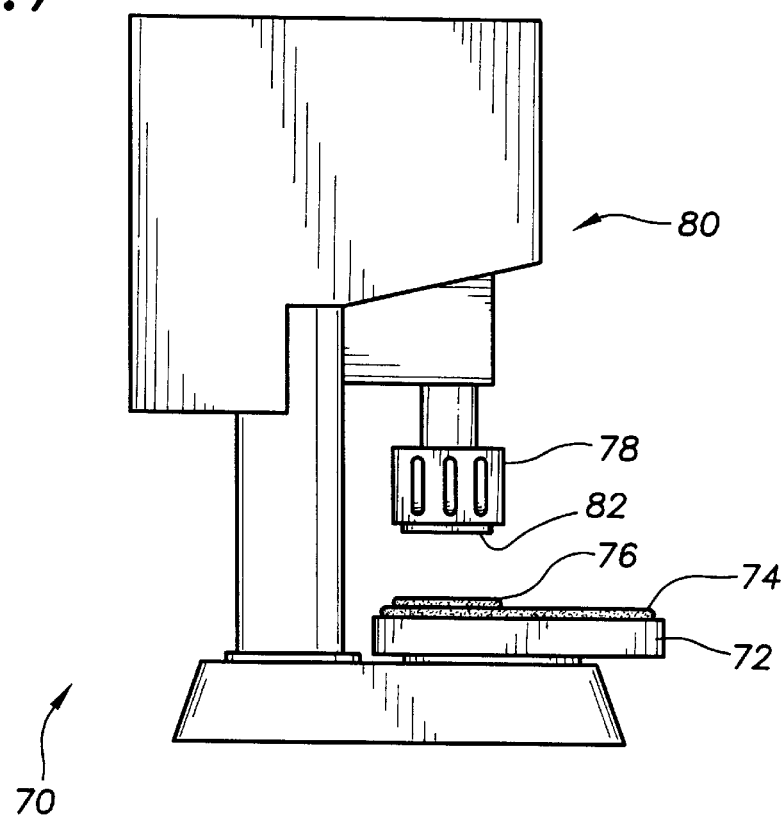
FIG. 7 is a side view depicting an apparatus employed in ultrasonically joining a heel pad to a floor mat, with a floor mat and a heel pad positioned on a lower fixture of the apparatus.
Figure 8:
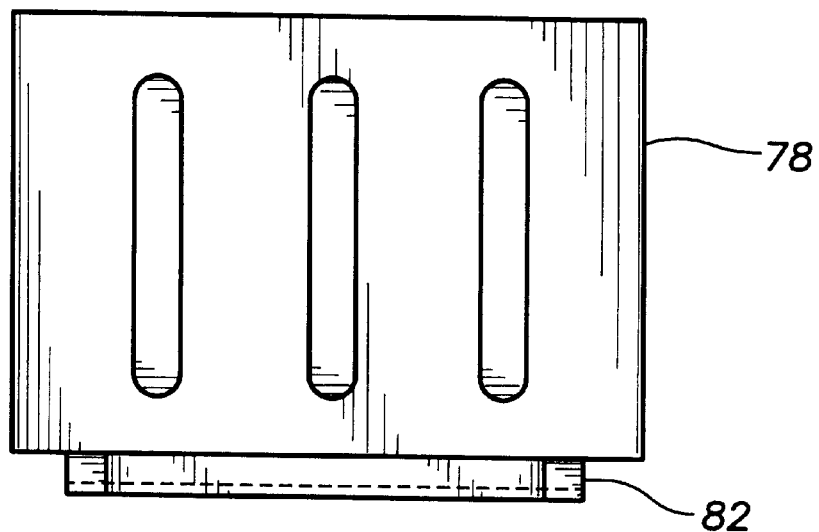
FIG. 8 is a side view illustrating a portion of the apparatus used in ultrasonically joining the heel pad to the floor mat.
Figure 9:
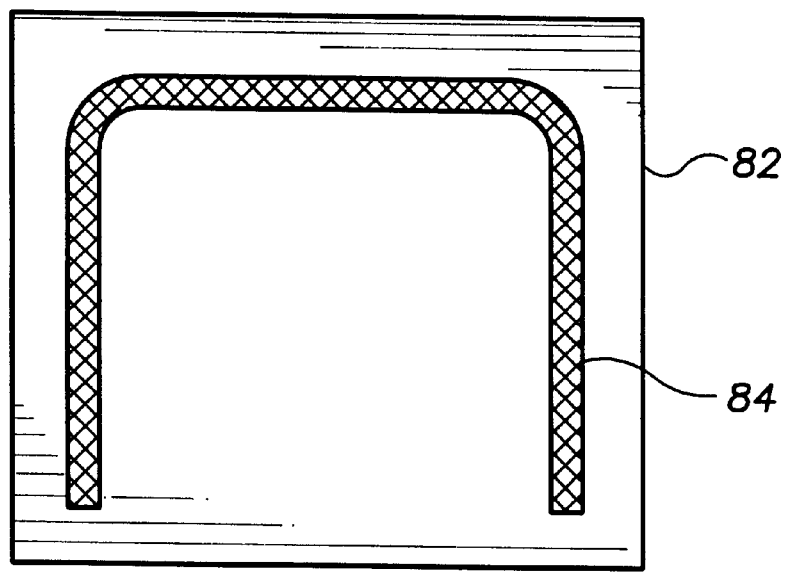
FIG. 9 is a bottom view illustrating the tool shown in FIG. 8.

FIGS. 7 & 8 illustrate an apparatus 70 which may be employed to ultrasonically join the perimeter region of a heel pad to a floor mat. Apparatus 70 may include a lower fixture 72 configured for accepting a floor mat 74 and a heel pad 76. Located above lower fixture 72 may be a horn 78, which is attached to an upper fixture 80. A face plate 82 may be attached to horn 78, and a U-shaped section 84 may project away from face plate 82, corresponding to a portion of the perimeter region of the heel pad sought to be joined, may project away from horn 78. As is known in the art, U-shaped section 84 may include a knurled pattern.

Operationally, floor mat 74 and heel pad 76 may be positioned on lower fixture 70 by an operator. Thereafter, horn 78 may be lowered so that U-shaped section 84 comes into contact with the perimeter region of heel pad 76. After the desired pressure is reached, e.g., 50 pounds, the ultrasonic welding apparatus is activated to the specified frequency, e.g., 20K hertz, for the specified time, e.g., 6 seconds. The ultrasonic vibration welding apparatus has a power rating of at least 2,000 watts.

Because U-shaped section 84 only corresponds to a portion of the perimeter region, preferably one-half of the perimeter region, it is necessary to rotate lower fixture 70 so that the remaining portion of the perimeter region of heel pad 74 can be sealed to floor mat 76. After the first one-half of the heel pad is sealed, horn 78 may be raised and lower fixture 70 rotated 180 degrees so that the remaining one-half of the heel pad can be joined to the floor mat. After rotation of the heel pad is complete, the ultrasonic welding process is repeated.

The result of employing the ultrasonic welding technique to rim seal heel pads to floor mats is to create an aesthetically pleasing perimeter or rim region of the heel pad, i.e., a crisp, clean look about the peripheral edge of the heel pad. Not only is the impression created about the rim aesthetically pleasing, but the seal between the heel pad and floor mat may result in a better joint between the heel pad and the floor mat, thus further preventing the heel pad edges from peeling or fraying.

The method of ultrasonically joining or welding a perimeter region of the heel pad to the floor mat is preferably performed after vibration welding has been completed, as described above. Also, ultrasonic rim sealing is preferably employed with materials such as polypropylene, and other alternatives having low melting point temperatures.

While several aspects of the present invention have been described and depicted herein, alternative aspects may be effected by those skilled in the art to accomplish the same objectives. For example, while the first region of the platen is preferably skewed in relation to the second region by 5 degrees, other angles of skew may be selected in accordance with the principles of the subject invention. Also, while a specific pin head configuration is disclosed herein having specific face angles, other face angles may also be used in the present invention. Furthermore, while the pins described herein are preferably of equal length and spaced equally apart from one another, the length of the pins may be modified, as well as the density and spacing of the pins. Accordingly, it is intended by the appended claims to cover all such alternative aspects as fall within the true spirit and scope of the invention.

What is claimed:

1. A method for joining a heel pad to a floor mat, comprising:

vibrationally welding said heel pad and said floor mat such that a perimeter region of said heel pad is recessed lower than an interior region of said heel pad; and ultrasonically welding at least a portion of said recessed perimeter region of said heel pad to said floor mat.

2. The method of claim 1, further comprising an earlier step of applying a glue between said heel pad and said floor mat such that said vibrational welding activates said glue for adhering said heel pad and said floor mat.

3. The method of claim 1, wherein said heel pad is fabricated from polypropylene.

4. The method of claim 3, wherein said floor mat is constructed of polypropylene.

5. The method of claim 1, wherein said heel pad and said floor mat are both nylon.

6. A method for vibrationally welding a heel pad to a floor mat, comprising:

positioning a floor mat and a heel pad on a fixture below a platen, said platen having a first region and a second region, a first plurality of pins extending from said first region and a second plurality of pins extending from said second region, said first plurality of pins being arranged non-parallel to said second plurality of pins;

applying forced engagement of said platen and said heel pad such that said first region and said second region engage said heel pad;

vibrating said platen so as to join said heel pad and said floor mat such that a perimeter region of said heel pad corresponding to said first region of the platen is recessed lower than an interior region of said heel pad corresponding to said second region of said platen.

7. The method of claim 6, further comprising applying a heat activated glue between said heel pad and said floor mat.

8. The method of claim 7, wherein said vibrating step activates said glue for joining said heel pad and said floor mat.

9. The method of claim 6, wherein said first region of said platen is skewed in relation to said second region of said platen, and said second plurality of pins is oriented perpendicular to a planar surface of said second region.

10. The method of claim 6, further comprising applying forced engagement of said platen and said heel pad of at least 2,000 pounds of pressure, vibrating said platen at least 200 cycles per second, for at least 10 seconds.

11. A method for joining a heel pad to a floor mat, comprising:
   ultrasonically welding just a perimeter region of said heel pad to said floor mat.

12. The method of claim 11, wherein said welding comprises:
   ultrasonically welding a first portion of said perimeter region of said heel pad to said floor mat; and
   subsequently ultrasonically welding a second portion of said perimeter region of said heel pad to said floor mat.

13. The method of claim 11, wherein said heel pad and said floor mat are both fabricated from polypropylene.

14. In a method of joining a heel pad to a floor mat, the improvement comprising:
   ultrasonically welding a first portion of a perimeter region of said heel pad to said floor mat; and
   subsequently ultrasonically welding a second portion of said perimeter region of said heel pad to said floor mat.

15. A method for joining a heel pad to a floor mat, comprising:
   vibrationally welding said heel pad to said floor mat; and
   ultrasonically welding at least a portion of a perimeter region of said heel pad to said floor mat.

16. A tool for use in joining a heel pad to a floor mat, said tool comprising:
   a platen having a first region and a second region;
   a first plurality of pins extending from said first region of said platen;
   a second plurality of pins extending from said second region of said platen;
   wherein said first plurality of pins are arranged non-parallel to said second plurality of pins.

17. The tool of claim 16, wherein said first region of said platen is located about a perimeter thereof, and said second region of said platen is surrounded by said first region.

18. The tool of claim 17, wherein said first plurality of pins comprises eight rows of pins.

19. The tool of claim 18, wherein said first region has a width of at least one inch.

20. The tool of claim 17, wherein a common border separates said first region of said platen and said second region of said platen, said first region being skewed in relation to said second region such that a planar surface of said first region is uneven with a planar surface of said second region.

21. The tool of claim 20, wherein an angle less than 180 degrees is formed between said first region and said second region.

22. The tool of claim 16, wherein each of said second plurality of pins extend perpendicular to a planar surface of said second region, and are arranged parallel to one another.

23. The tool of claim 17, wherein said second region is rectangular and said first region comprises a first face, a second face, a third face and a fourth face, wherein each face corresponds to a respective side of said second region, each face being skewed in relation to a planar surface of said second region, each face forming its own planar surface.

24. The tool of claim 8, wherein an angle of less than 90 degrees is formed between a longitudinal axis of each of said first plurality of pins and the planar surface of its corresponding face.

25. The tool of claim 1, wherein each of said first plurality of pins includes a pin head having an upper surface and four side faces, wherein at least one of said side surfaces is formed at a 45 degree angle in relation to said upper surface and at least one of said side surfaces is formed at a 30 degree angle in relation to said upper surface.

26. The tool of claim 1, wherein each of said second plurality of pins includes a pin head having an upper surface and four side faces, wherein each of said side surfaces are formed at a 45 degree angle in relation to said upper surface.

27. The tool of claim 1, wherein all of said first plurality of pins and said second plurality of pins are of equal height.

28. Apparatus for vibrationally welding a heel pad to a floor mat, said apparatus comprising:
   a fixture configured for positioning said floor mat and said heel pad on said fixture;
   a platen having a first region and a second region, said platen having a first plurality of pins extending from said first region and a second plurality of pins extending from said second region, wherein said first plurality of pins are arranged non-parallel to said second plurality of pins;
   said fixture and said platen being movable between an open position for insertion and removal of said floor mat and said heel pad, and a closed position for providing forced engagement between said heel pad and said floor mat; and
   means for vibrating said platen while said fixture and said platen are in said closed position.

29. The apparatus of claim 28, wherein said first region of said platen is located about a perimeter thereof and said second region of said platen is located within said first region.

30. The apparatus of claim 29, wherein said first region is skewed in relation to said second region.

31. The apparatus of claim 30, wherein an angle less than 90 degrees is formed between a longitudinal axis of each of said first plurality of pins and a planar surface of said first region.

* * * * *

UNITED STATES PATENT AND TRADEMARK OFFICE
CERTIFICATE OF CORRECTION

PATENT NO. : 5,938,873
DATED : August 17, 1999
INVENTOR(S) : Bailey et al.

It is certified that error appears in the above-identified patent and that said Letters Patent is hereby corrected as shown below:

IN THE CLAIMS:

Claim 24, Col. 10, line 7, delete "8" and replace with --23--.

Claim 25, Col. 10, line 11, delete "1" and replace with --16--.

Claim 26, Col. 10, line 17, delete "1" and replace with --16--.

Claim 27, Col. 10, line 21, delete "1" and replace with --16--.

Signed and Sealed this

Fourth Day of January, 2000

Attest:

Attesting Officer     *Acting Commissioner of Patents and Trademarks*